United States Patent [19]
O'Boyle

[11] Patent Number: 4,494,285
[45] Date of Patent: Jan. 22, 1985

[54] METHOD OF MAKING A MEMBER DEFINING A LUMEN FOR A PERISTALTIC PUMP AND MEMBER PRODUCED BY SAID METHOD

[75] Inventor: Matthew O'Boyle, Somers, Conn.

[73] Assignee: Windsor Medical, Inc., Enfield, Conn.

[21] Appl. No.: 488,454

[22] Filed: Apr. 25, 1983

Related U.S. Application Data

[63] Continuation-in-part of Ser. No. 408,198, Aug. 16, 1982.

[51] Int. Cl.³ .............................................. B23P 15/00
[52] U.S. Cl. ................................... 29/156.4 R; 29/407; 29/463; 156/64; 156/245; 156/292; 156/308.6; 264/248; 264/267; 417/476; 418/45; 604/153
[58] Field of Search ................ 29/156.4 R, 407, 463; 156/245, 292, 308.4, 308.6, 64, 110.1, 118, 305; 264/248, 261, 262, 263, 264, 267, 272.2; 604/153; 417/476, 475; 418/45; 428/35, 423.3

[56] References Cited

U.S. PATENT DOCUMENTS 2,249,806  7/1941  Bogoslowsky ...................... 418/45
2,324,974  7/1943  Greenup ........................ 156/118 X
2,726,925  12/1955 Saulino ......................... 264/248 X
3,053,609  9/1962  Miller ......................... 156/308.6 X
3,390,482  7/1968  Holtvoigt ...................... 156/292 X
3,458,373  7/1969  Knipp et al. ................... 156/245 X
3,669,578  6/1972  Nameny ............................ 418/45
3,740,290  6/1973  Kelsey et al. .................. 156/64 X
3,807,009  4/1974  Östbo ........................... 29/463 X
4,033,331  7/1977  Guss et al. ..................... 128/657
4,038,359  7/1977  Pendleton ....................... 264/263
4,131,604  12/1978 Szycher .......................... 3/1 A X
4,152,098  5/1979  Moody et al. ................... 604/153 X
4,297,160  10/1981 Kusayama et al. ................ 156/64 X
4,392,794  7/1983  Foxcroft ........................ 417/475
4,445,886  5/1984  Osterholm ........................ 604/28

Primary Examiner—Charlie T. Moon
Assistant Examiner—Ronald S. Wallace
Attorney, Agent, or Firm—Antonelli, Terry & Wands

[57] ABSTRACT

A peristaltic pump comprising a housing member containing a member having resilient walls defining a lumen, a shaft is rotatably mounted in the housing and carries a pumping member thereon extending radially of the shaft which acts on the lumen in a plane perpendicular to the axis of the shaft. The defined lumen is preferably elliptical in cross-section.

11 Claims, 22 Drawing Figures

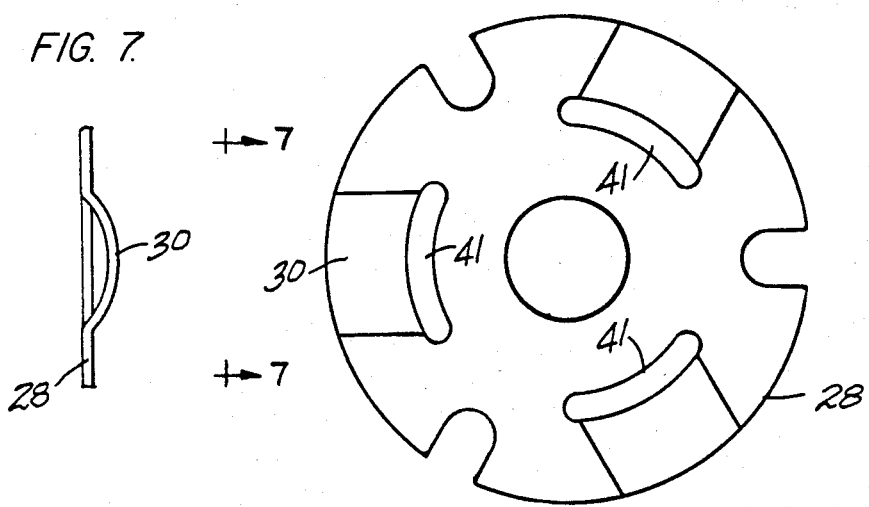
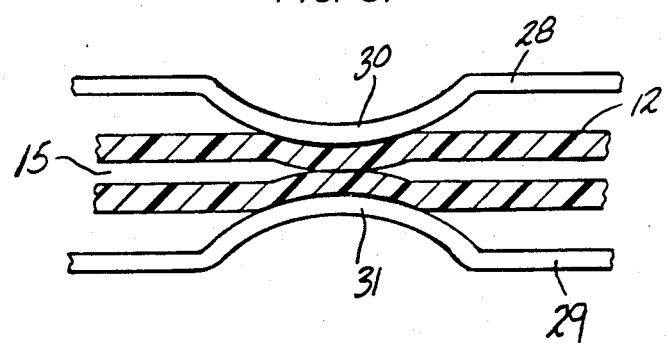

DISCHARGE FLOW

COMPRESSION CAM (C1) POSITION

METHOD OF MAKING A MEMBER DEFINING A LUMEN FOR A PERISTALTIC PUMP AND MEMBER PRODUCED BY SAID METHOD

CROSS REFERENCE TO RELATED INVENTION

This application is a continuation-in-part application of applicant's earlier, copending application Ser. No. 408,198 filed Aug. 16, 1982.

FIELD OF THE INVENTION

This invention relates to pumps and more particularly relates to peristaltic pumps and methods of making the same.

BACKGROUND OF THE INVENTION

Peristaltic pumps generally comprise a housing member defining an arcuate surface less than 360° and receive a resilient tubing in the inner radial periphery of the housing. A rotatable member having pressure elements or rollers engages the resilient tubing at spaced apart points and compresses the tubing. As the pressure elements move along the tubing, a liquid is drawn from a suction end and supplied under pressure to a supply end.

Peristaltic pumps are widely used; however, they inherently contain three main drawbacks. By virtue of the construction, a relatively high torque is required to drive the rotating member, the resilient tubing is subject to stretch or creep due to the pressure exerted thereon in an attempt to achieve complete closure of the tube, and there is always some backflow as the pressure point leaves engagement with the tubing near the discharge end. The high pressure exerted on the tubing further contributes to the required driving torque.

Peristaltic pumps have generally been constructed with a flexible, annular cross-section tube or pipe, which is disposed radially inwardly of a backing member. A rotatable member having a plurality of pressure rollers or cams compresses the tubing against the backing member and draws and pumps a fluid from a suction port to a discharge port. When such an annular cross-section tube is compressed to flattening, the radially inner and outer sides are flattened against each other, but the resulting bends at the sides of the flattened tube leave small residual gaps or clearances. This is detrimental because the resulting gaps detract from the pump's efficiency, do not provide positive liquid displacement, and the high strains created in the sides of the tube increase torque and aggravate the stretch or creep problem of the tube. U.S. Pat. No. 2,693,766 attempts to solve this problem with tubing especially moulded to have walls of decreased thickness at diametrically opposite areas, and specially formed backing members. However, this construction does not alleviate the problem of the high torque required to compress the tubing against the backing member.

Other embodiments of peristaltic pumps are shown in U.S. Pat. Nos. 2,885,967; 2,899,906; 2,930,326; 2,955,543; 2,977,890; and 3,358,609.

The present invention provides a peristaltic pump of new and improved construction which substantially reduces the required driving torque, provides a tube configuration which essentially eliminates tube stress leading to stretch or creep, and eliminates backflow from the supply.

SUMMARY OF THE INVENTION

Briefly stated, the invention in one form thereof comprises a pump housing having a lumen defining member therein which extends between and has flanges locked to inner and outer members. The length of the lumen subject to compression subtends an angle of greater than 180° and less than 360°, and extends between a suction port and a discharge port. An impeller having cams or pressure areas adapted to bear on walls defining the lumen, preferably opposite walls, is rotatably mounted with respect to the inner ring. The lumen is preferably designed with a generally ellipsoid cross-section, so that it may more easily be completely closed without undue pressure. With this arrangement, the torque required to operate the impeller is substantially reduced, and as a result, the tendency of the walls defining the lumen to creep or stretch is reduced. Moreover, the lumen is configured such that as the pressure cams gradually leave the lumen at the discharge end, they are compressing the lumen even when the lumen behind the pressure points is partially exposed to the outlet port. Thus, while there is a tendency for flow at the discharge port to decrease, the liquid displacement provided by the following pressure cam prevents backflow from the discharge port into the lumen.

In constructing the lumen defining member, a core member comprising a water soluble amalgam of mercury and an alkali metal is prepared in the shape of the lumen. The constituents of the amalgam are chosen to have a higher melting point than the material of the lumen defining member. Then the lumen defining member may be moulded about the core. Subsequently, the lumen defining member is subjected to an environment of high humidity or water to hydrolyze the water soluble metal amalgam and permit mercury to be removed from the lumen defining member.

According to another embodiment of the invention the lumen defining member is formed of separate, complementary upper and lower portions having flanges on either side of the lumen. These portions are bonded together at their flanges by solvent bonding to form the lumen defining member.

An object of this invention is to provide a new and improved peristaltic pump.

Another object of this invention is to provide a peristaltic pump of new and improved design which requires less torque to operate.

Another object of this invention is to provide a peristaltic pump having a new lumen configuration which reduces the torque required for operation of the pump and which reduces the tendency to stretch or creep with operational time.

A further object of this invention is to provide a peristaltic pump of new and improved construction which prevents backflow of the pumped fluid from the supply.

A further object of this invention is to provide new and improved methods of making a peristaltic pump.

A still further object of this invention is to provide new and improved methods of making a lumen defining member for a peristaltic pump.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIG. 6 is a view of one portion of an impeller or pumping member shown in FIG. 3;

FIG. 7 is a view seen in the plane of lines 7—7 of FIG. 6;

FIG. 8 is a view seen in the plane of lines 8—8 of FIG. 3;

DETAILED DESCRIPTION OF THE ILLUSTRATED EMBODIMENT

Figure 1:
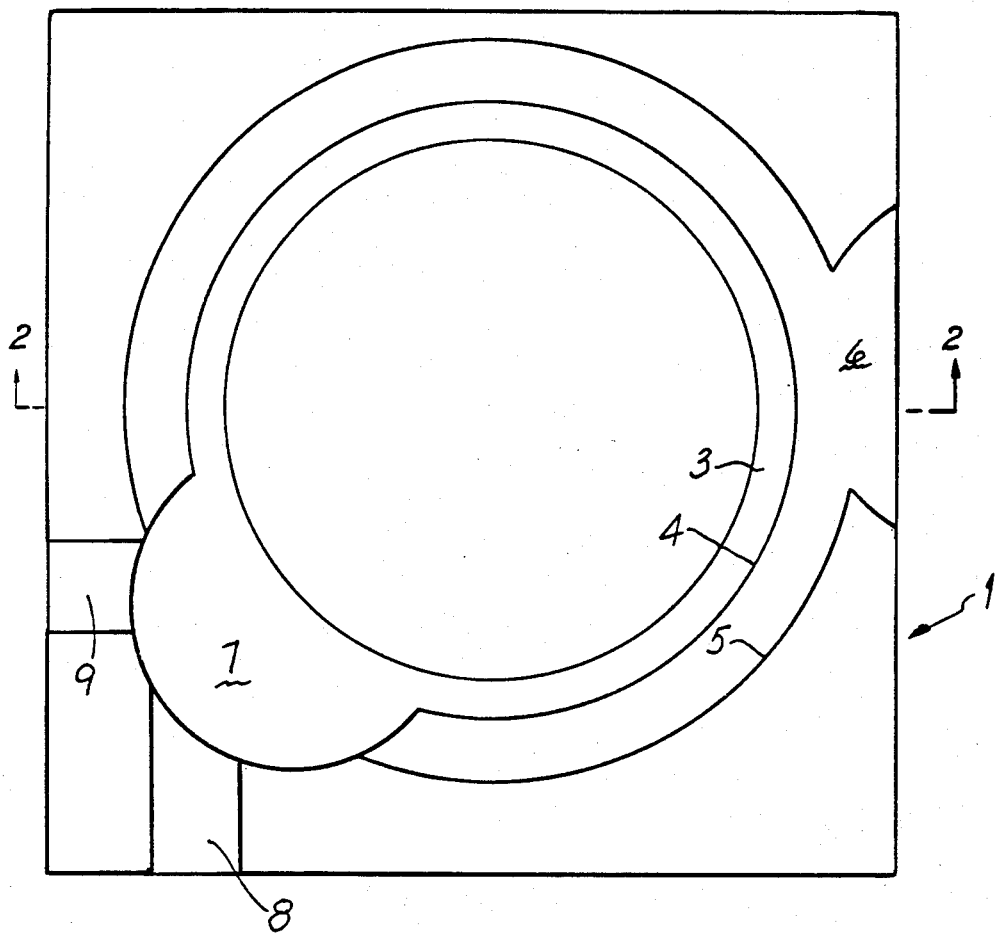
FIG. 1 is a plan view of a housing for a peristaltic pump embodying the invention with the covers removed.
Figure 2:
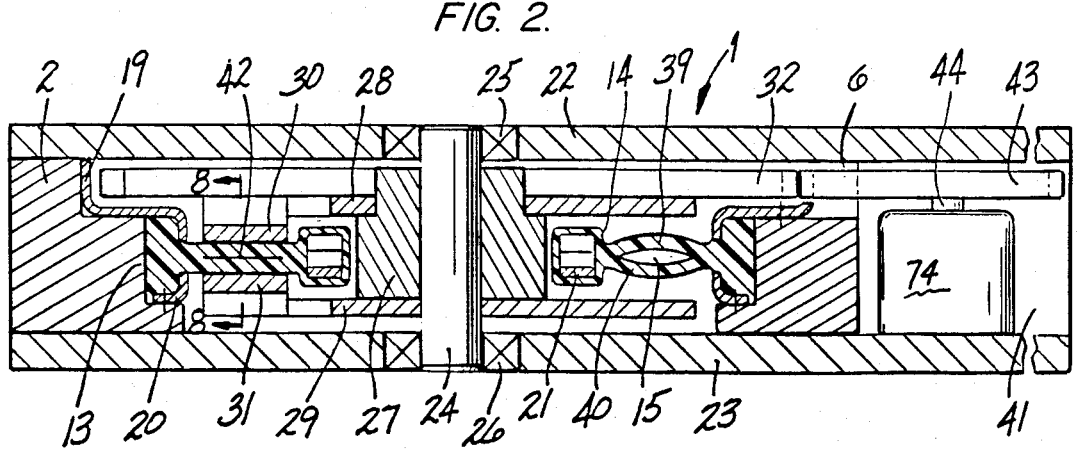
FIG. 2 is a view seen in the plane of lines 2—2 of FIG. 1 with the pump assembled to the housing and the covers thereon.
Figure 3:
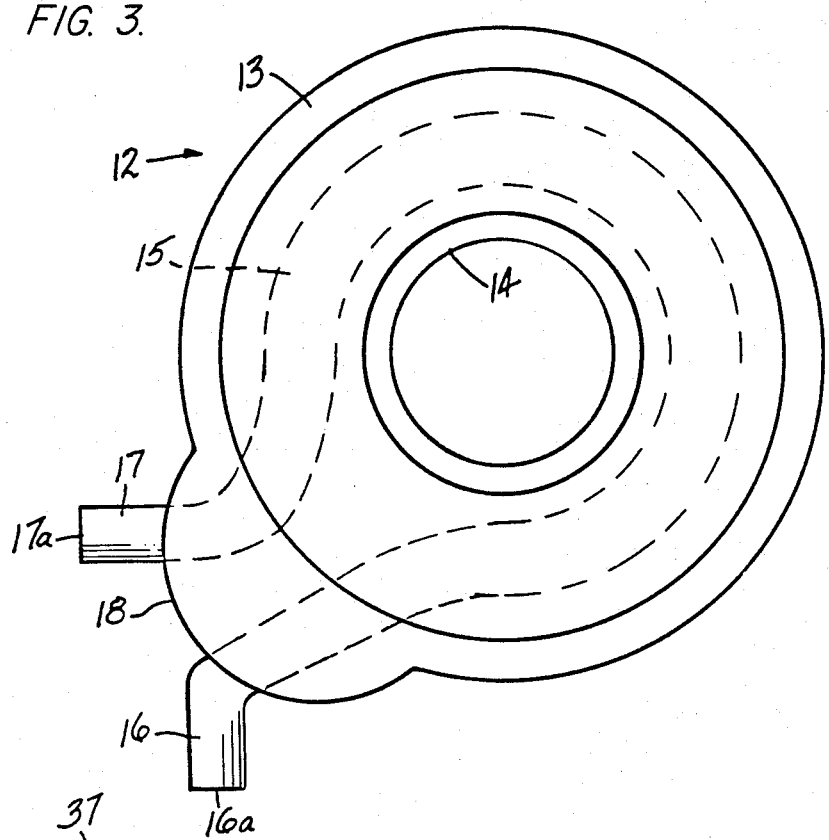
FIG. 3 is a plan view of a portion of the pumping mechanism which is received within the housing of FIG. 2.

FIGS. 1, 2 and 3 disclose a peristaltic pump 1 comprising a housing member 2 of rectangular shape as shown in FIG. 1, and formed to define an annular seat 3 below cylindrical walls 4 and 5. A side opening 6 is defined in housing 2 and a recess 7 is defined inwardly of the upper surface of housing 2 for purposes hereinafter described. Passages 8 and 9 are also defined in housing 2 to receive fluid conducting lines.

FIG. 3 shows in plan view a lumen defining member 12 which is received in the cavity of housing 2 defined by seat 3 and wall 4. Lumen defining member 12 is comprised of a non-rigid polymeric material and has an outer flange 13 and an inner flange 14. Member 12 defines a lumen 15 which is essentially annular throughout most of its length and then curves through inflexion to a suction tube 16 and a discharge tube 17. Suction tube 16 and discharge tube 17 are received in passages 8 and 9 respectively of housing 2. A portion 18 of member 12 is received in recess 7 of housing 2. Tube 16 terminates at a suction port 16a and tube 17 terminates at a discharge port 17a.

Reference is now made to FIG. 2 which shows the housing of FIG. 1 with the lumen defining member 12 of FIG. 3 therein. The outer flange 13 of member 12 is locked against wall 4 of housing 2 by an upper retaining ring 19 and a lower retaining ring 20. The retaining rings are suitably secured to housing member 2. The inner flange 14 of member 12 includes an annular stiffening member 21. the retaining rings 19 and 20 are suitably cut-away (not shown) to permit the lumen 15 to exit housing 2 into passages 8 and 9 through recess 7.

Figure 4:
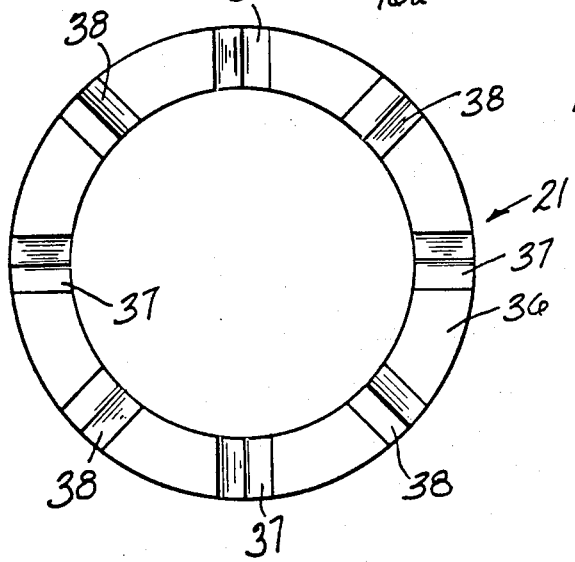
FIG. 4 is a plan view of an element of the pump shown in FIG. 3.
Figure 5:
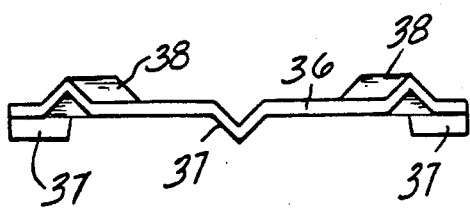
FIG. 5 is a side view of the element of FIG. 4.

Housing 2 with member 12 therein is closed by upper and lower cover plates 22 and 23 respectively. A shaft 24 is journaled in cover plates 22 and 23 on bearings 25 and 26 and carries thereon in fixed relation a support and spacing member 27. Support member 27 carries thereon an impeller or pumping member in the form of spaced apart upper and lower plates 28 and 29, each having cams 30 and 31 thereon adapted to compressively engage member 12 and close lumen 15. Support member 27 also has affixed thereto a gear 32 adapted to be engaged by the pinion of a drive system, hereinafter described. Member 21 carried by inner flange 14 is more clearly shown in FIGS. 4 and 5. Member 21 comprises a plate-like member 36 which is annular in form and has a plurality of upset triangular portions 37 and 38 alternately defined above and below the plane of member 36.

Figure 12:
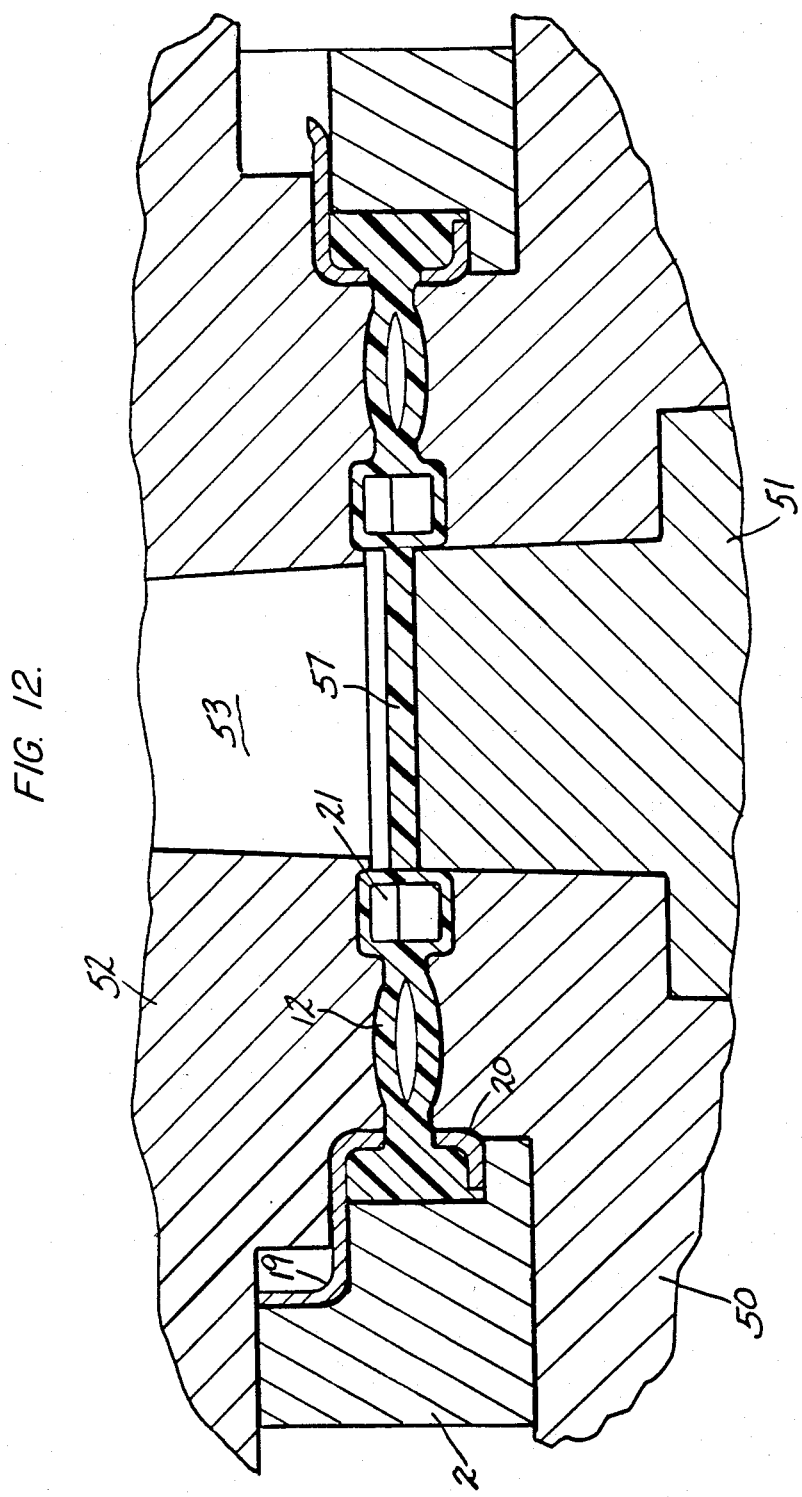
FIG. 12 is a sectional view through a mould illustrating the method by which a portion of a pump embodying the invention is made.

In assembly, member 12 is moulded of a non-rigid polymer material between outer wall 4 and inner member 36 about a lumen defining form or core, which may be a mercury-alkali metal amalgam. This amalgam is selected so that the alkali metal will solubilize in water. When subjected to high humidity or water, the alkali metal, which may be lithium, will hydrolyze, leaving the mercury in a liquid state, which is then poured out of the defined lumen. The member is cast in situ in housing member 2, with the retaining ring 20 secured to seat 3 and retaining ring 19 secured to walls 4 and 5. The lumen defining core is held in place at points external of housing 2, mould defining members close the upper and lower openings of member 2 and the material of member 12 is introduced into the cavity of member 2 about the lumen defining core and stiffening member 21. As thus formed, the outer flange 13 locked against wall 4 resists torque exerted on member 12, while the stiffening member 21 distributes stress tending to wind up the web portion of member 12 between flanges 13 and 14. This method of moulding is more specifically set forth in conjunction with FIGS. 12 and 13, as hereinafter described.

The generally ellipsoid or bi-convex shape of lumen 15 is chosen so that the upper wall portion 39 and lower wall portion 40 of member 12 defining the lumen 15 may be fully compressed to completely close lumen 15 in operation of the pump. With this configuration, less pressure is required to completely close the lumen and there will be little or no stress at the edges of the lumen which would tend to cause creep or stretch of the material of member 12. Therefore, lumen 15 may be completely closed, as shown at 42 in the left-hand side of FIG. 2.

Impeller member 28, which is identical to impeller member 29, is shown in FIGS. 6 and 7. As shown, member 28 is formed with three equiangularly spaced arcuate sections 41 removed, and three equiangularly spaced compression areas or cams 30 are upset from the plane of member 28. When thus formed, the members 28 and 29 are assembled and affixed to support member 27 with compression cams 30 and 31 vertically (as shown in FIG. 2) aligned on either side of lumen 15. As shown in FIG. 8, as the impeller is rotated, the compression cams completely close lumen 15 as they travel along the length thereof.

Figure 9:
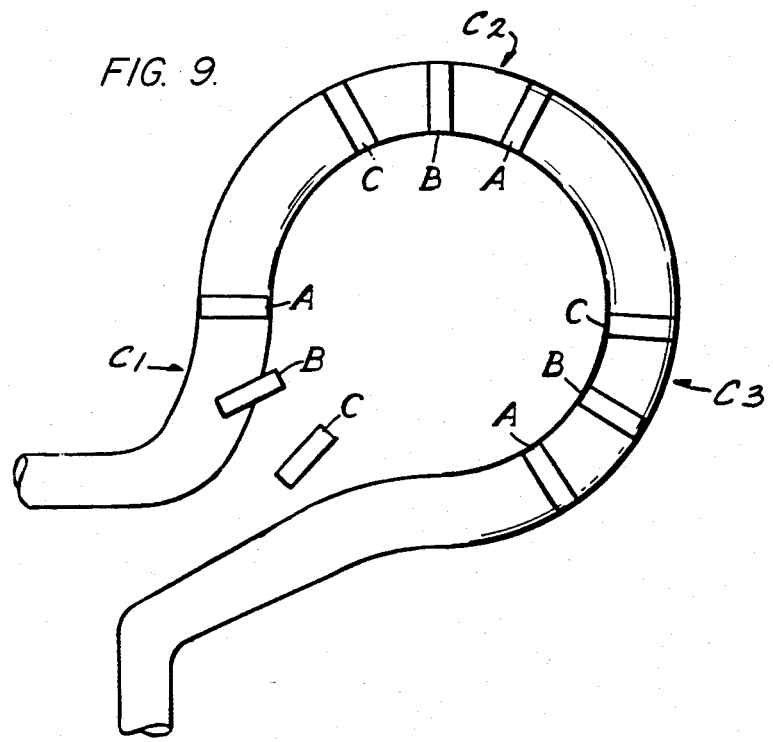
FIG. 9 is a diagrammatic view of the pump lumen and the operation of pressure cams thereon.

FIG. 9 exemplifies lumen 15 with three lumen compression areas, A, B, and C, for each of three compression cams C1, C2, and C3 as the impeller rotates counter-clockwise, as shown. Each compression position is a small area as shown in FIG. 9. The cams are referred to as C1, C2, and C3.

At compression area A, cam C1 is about to leave full width contact with the walls defining lumen 15, but has not yet allowed communication between the lumen cam C1 and the discharge port. When cam C1 reaches compression area B, it provides partial communication of the lumen therebehind with the discharge port. However, cam C2 has advanced to its position B and is forcing fluid through lumen 15. As cam C1 travels from area A to area B and subsequently to C, where the lumen behind cam C1 is in full communication with the discharge port, the flow of fluid at discharge port 17a will drop, but due to the gradual exposure of the lumen behind cam C1, and the advance of cam C2, there is no backflow of fluid from the supply port.

Figure 10:
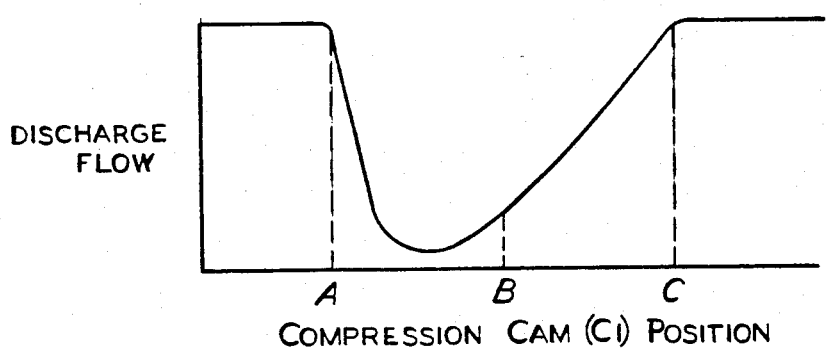
FIG. 10 is a graphical representation of fluid flow at the discharge port of the pump as a function of position of compression of the pump lumen.

FIG. 10 is a graphical representation of the flow at discharge port 17a as a function of rotation of the impeller. FIG. 10 shows that the flow at discharge port 17a decreases as a cam C1 gradually exposes the lumen therebehind from areas A to B to the discharge port and thereafter starts to increase to position C due to the action of cam C2. The flow never becomes negative, a condition which may occur in peristaltic pumps where a compression cam or roller rather abruptly leaves contact with a tube.

Figure 14:
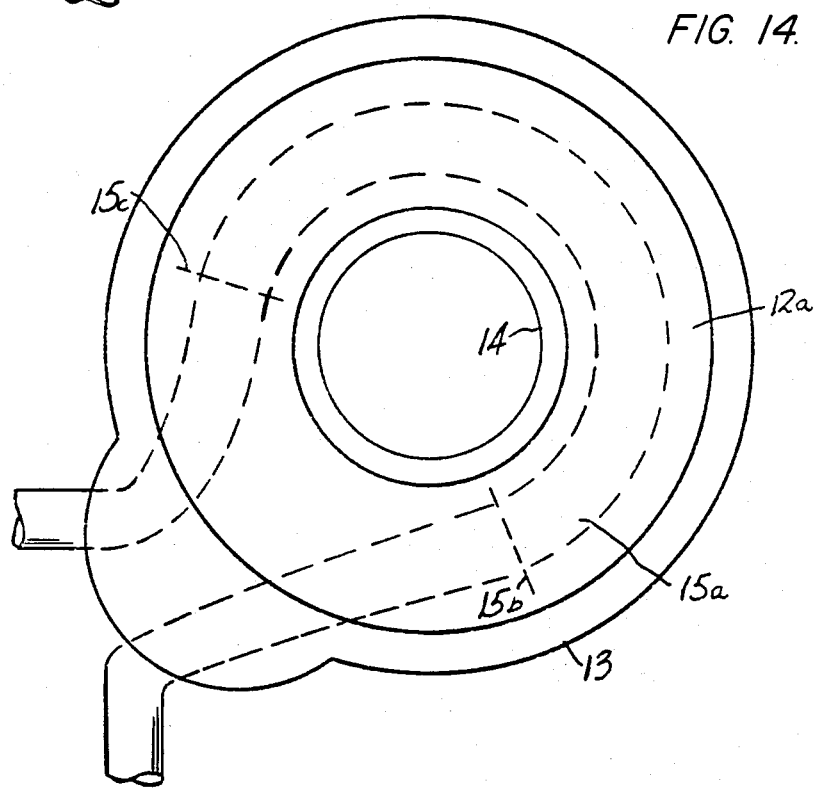
FIG. 14 is a plan view of another embodiment of a lumen defining member.

The lumen may have tangential transition from the partial annular portion thereof rather than with inflexion as shown. This arrangement would not cause as great a drop in flow rate as exemplified in FIG. 10, since there would be a greater number of transitional degrees for the compression cams 30 and 31 to clear the lumen. However, this arrangement would result in a partially annular lumen subtending a lesser number of degrees and therefore less volumetric flow of fluid per revolution of the impellers 28 and 29. A lumen defining member 12a having lumen 15a where the lumen departs from the partially annular portion at points 15b and 15c is shown in FIG. 14.

The lumen has been spoken of as generally ellipsoid in cross-section as opposed to round. However, it is desired that the edges of the lumen terminate at the smallest possible angle, if not a point, to provide a hinge effect and permit complete closure of the lumen under minimum compression. Thus, the lumen may be defined in cross-section as being bi-convex with the edges terminating substantially at a point.

Disposed in a chamber 41 defined by cover plates 22 and 23 is a motor and gear drive unit 74 having a pinion 43 on shaft 44 thereof, which extends into opening 6 in housing member 2 to mesh with gear 32 and drive shaft 24. The motor is preferably of the bi-polar pulse type, and the drive gear unit may be similar to that of a watch.

A pump embodying the invention may be made very small in size and arranged to infuse medication, such as insulin, to the human body, and may be part of an implant system in the human body.

By virtue of the arrangement of the cams 30 and 31 working on opposite sides of the ellipsoid cross-section lumen, the required operating torque is quite low with respect to the conventional peristaltic pump, where an annular cross-sectional tube is compressed in a radial direction against a backing surface. The cross-sectional shape of the lumen permits the lumen to be completely closed without application of high pressure. This eliminates or substantially reduces stretch or creep of the material defining the lumen, and prolongs the useful life thereof. The gradual opening of the lumen behind a compression cam as it leaves the lumen prevents any sudden backflow.

Figure 11:
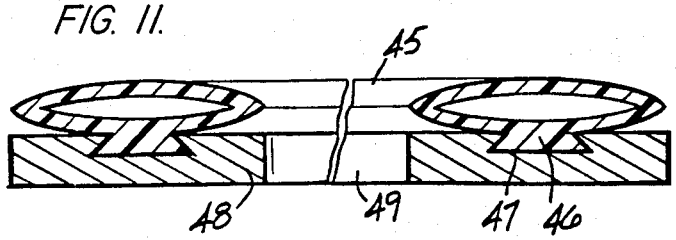
FIG. 11 is a sectional view of an alternate embodiment of a lumen defining member which may be utilized in the invention.

FIG. 11 exemplifies an alternate lumen arrangement where the lumen is acted upon on only one side by the pumping member. A lumen defining member 45 moulded in a manner as previously described has a dove-tailed shaped portion 46 received in a mating cut-out 47 in a base-plate 48. Base-plate 48 has a central opening 49 to permit shaft 24 to pass therethrough. In this embodiment, base-plate 48 would be secured to lower cover member 22, and only upper impeller plate 28 would be utilized. The driving torque in this arrangement may be slightly higher than that required where the pumping member compresses both sides of the lumen, but will be less than conventional peristaltic pumps.

In forming the lumen defining member 12, the housing member 2 is provided with the retaining rings 19 and 20 secured thereto. This assembly is then supported on a lower moulding member 50, which also provides a seat for stiffening member 21. A closure member 51 is inserted into member 50, and an upper moulding member 52 engages housing member 2 and together with member 50, defines a mould for lumen defining member 12. Member 52 defines a gate 53 for the introduction of moulding material therein.

Figure 13:
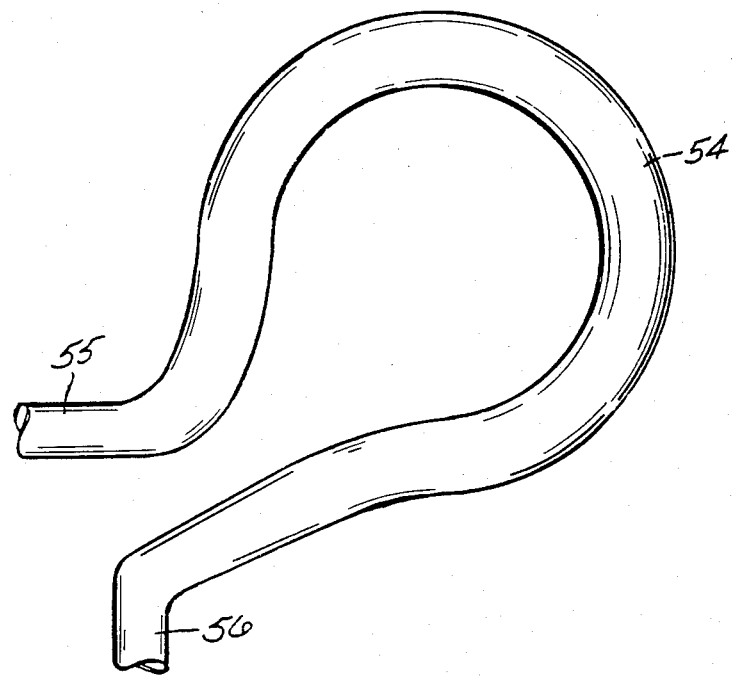
FIG. 13 is a plan view of a core utilized in making a lumen defining member.

A lumen core 54, as shown in FIG. 13, is placed in the mould prior to closing thereof by member 52 and externally supported on legs 55 and 56 extending through passages 8 and 9 of housing member 2. The core 54 has transition from the ellipsoid shape previously described in the range acted upon by cams 30 and 31 to a tubular cross-section in passages 8 and 9.

In the moulding operation, the material of lumen defining member 12 is introduced in a plastic state through gate 53 and forms the lumen defining member 12 about core 54 and between inner stiffening member 21 and housing member 2. After the material of the lumen defining member has set, the central disk 57 may be cut away from the inner diameter of member 21. The material of the core will be chosen in accordance with the fluid to be pumped. Examples of thermoplastic material are silicone rubber, polyether, and siloxane. Thermosetting material may include polyethelene and PTFE.

Thereafter, the housing member 2 with the lumen defining member therein may be assembled to the cover plates, as shown in FIG. 2.

The core member 54 is formed of an amalgam which is preferably a mercury-alkali metal having a melting point higher than that of the material of the lumen defining member 12. The alkali metals are lithium, sodium, potassium, rubidium, calcium, or caesium.

The ratio of the mercury-alkali metal is preferably one-third to two-thirds atomic weight lithium and two-thirds to one-third atomic weight mercury.

The choice of the constituents of the water soluble amalgam will depend on the melting point of the material of the lumen defining member; the desired time for hydrolyzing the water soluble metal; and the relative humidity or rate of application of water to the core.

In the embodiment of the invention illustrated in FIGS. 15-22, wherein like reference numerals are used to indicate like parts as described with respect to the embodiment of FIGS. 1-9, a peristaltic pump 60 includes a lumen defining member 61 formed of complementary upper and lower portions 62 and 63 which are bonded together at flanges 64 provided thereon on either side of the lumen 15.

Figure 16:
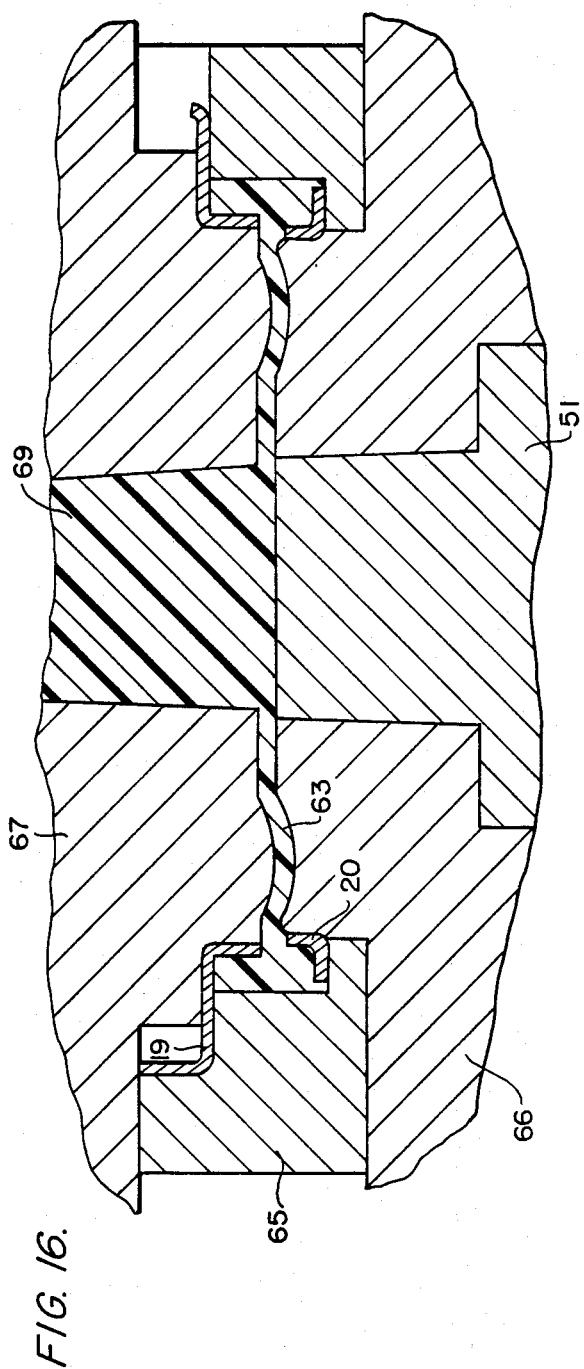
FIG. 16 is a sectional view through a mould illustrating the method by which a portion of the pump of FIG. 15 is made.

The method of the invention for forming the peristaltic pump 60, and particularly the lumen defining member 61 thereof, includes moulding the lower half 63 of the member 61 in situ in the housing member 65 with retaining rings 19 and 20 as shown in FIG. 16. Moulding is accomplished in a manner similar to that discussed above with respect to the previously described embodiment. However, with this method the need for a core is eliminated, the confines of the lower half 63 being defined entirely by means of the housing member 65, retaining rings 19 and 20, lower moulding member 66, upper moulding member 67 and closure member 81. The lower half 63 is further illustrated in FIGS. 19-21.

Figure 15:
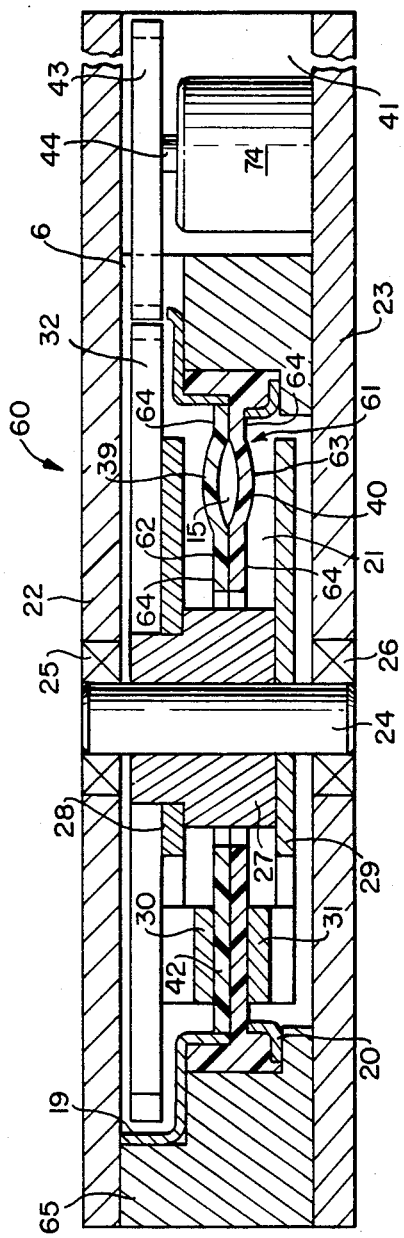
FIG. 15 is a partial cross sectional view similar to FIG. 2 of another embodiment of a peristaltic pump according to the invention wherein the member defining the lumen of the pump is formed of complementary upper and lower portions which are bonded together.
Figure 17:
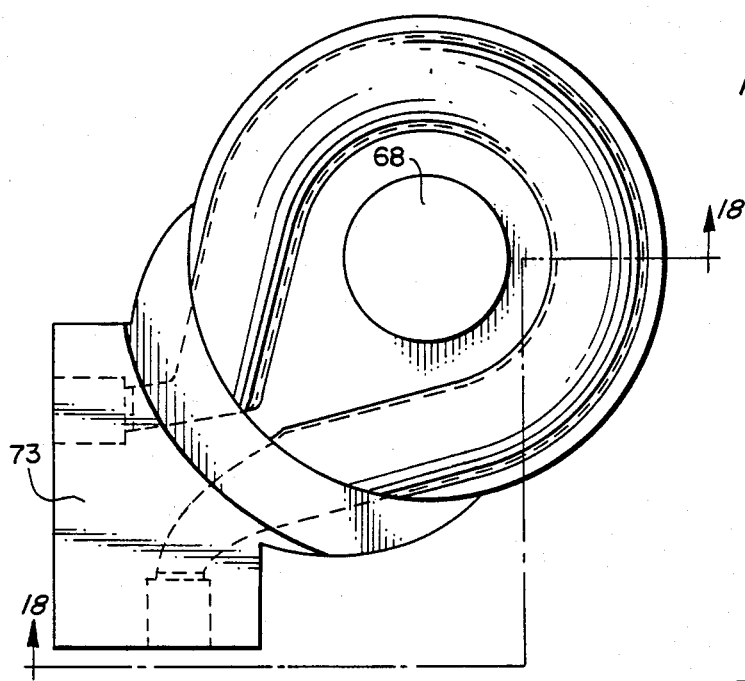
FIG. 17 is a plan view of the upper portion of the member defining the lumen in the embodiment of FIG. 15.
Figure 18:
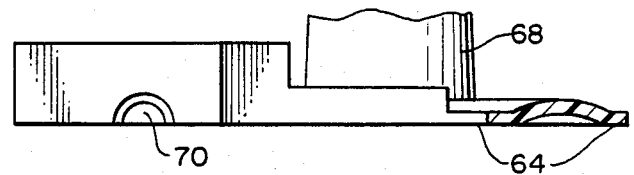
FIG. 18 is a side view, partially in cross section, of the upper portion of the member defining the lumen taken along the line 18—18 in FIG. 17.
Figure 19:
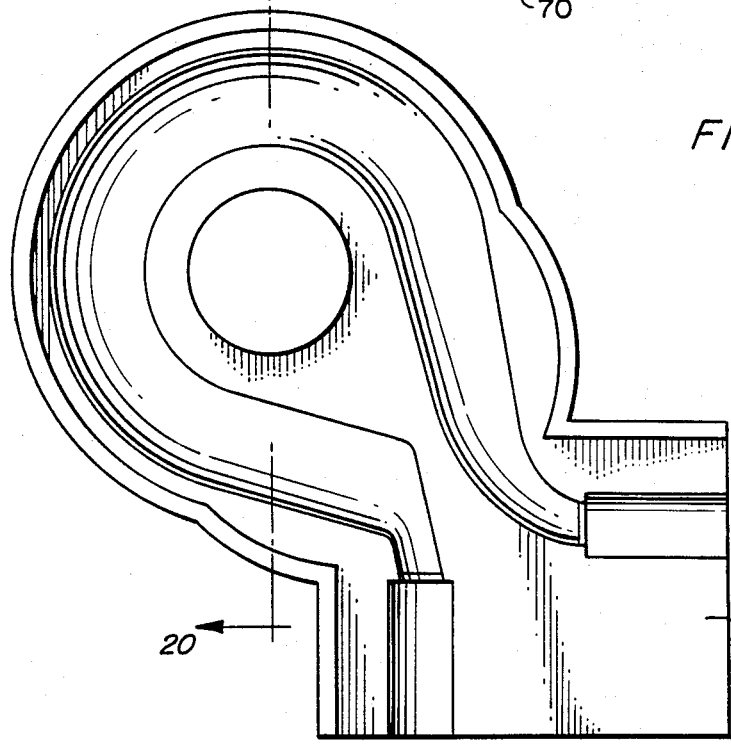
FIG. 19 is a plan view of the lower portion of the member defining the lumen in the embodiment of FIG. 15.
Figure 20:
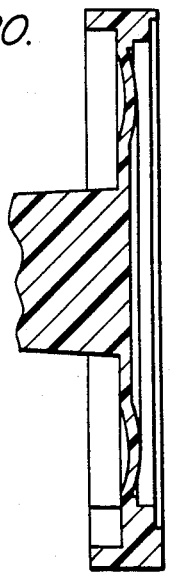
FIG. 20 is a sectional view of the lower portion shown in FIG. 19 taken along the line 20—20.
Figure 21:
FIG. 21 is a side view of the lower portion shown in FIG. 19 taken in the direction of arrow A.
Figure 22:
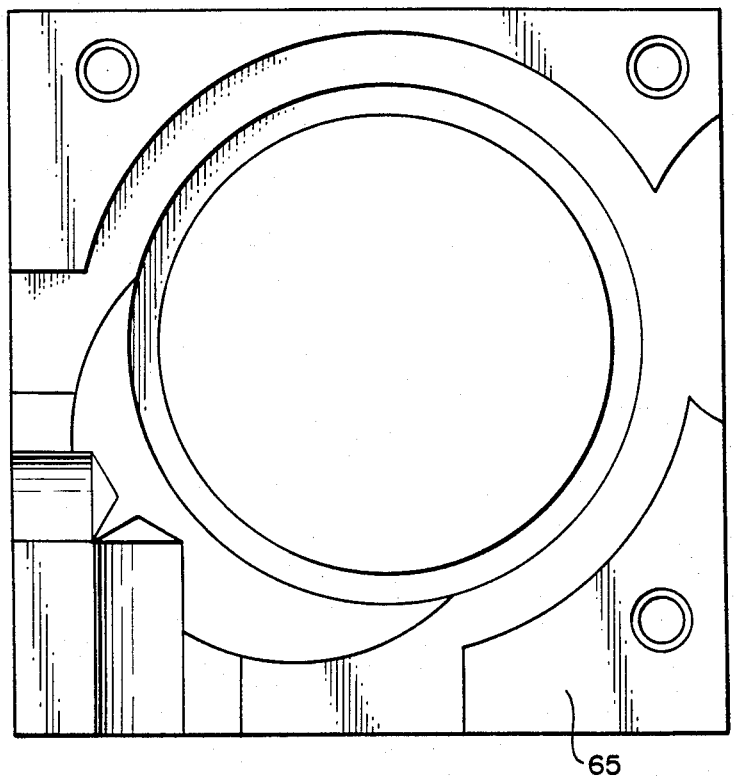
FIG. 22 is a plan view of the housing for the peristaltic pump of FIG. 15 with the covers removed.

The upper half 62 of the lumen defining member 61, depicted generally in FIG. 15 and further illustrated in FIGS. 17 and 18, is separately moulded as by injection moulding between cooperating, removable mould halves. A central opening 68 is formed in the upper half 62 during moulding or as a result of trimming thereafter so that the upper half 62 can be positioned in the housing 65 adjacent the lower half 63 about the central disk or sprue 69 of the latter.

The upper and lower halves 62 and 63 are bonded to one another at their cooperating flanges 64 by chemical or solvent bonding. This is accomplished by coating the flanges 64 of each half with a solvent of the material of which the halves are formed and then placing the opposing flanges 64 of the halves in contact with one another for a period of time to let evaporation and bonding take place. The upper and lower halves 62 and 63 may be formed of any elastomeric low hysteresis polymer. In the disclosed embodiment the halves 62 and 63 are formed of polyether based polyurethane elastomer. This material is approximately twenty times stronger than Silastic a trademark of Dow Corning Corporation, for example, and permits the omission of a stiffenig member such as that shown at 21 in the previously described embodiment since the inner flange of the lumen defining member 61 itself has sufficient strength to distribute stresses tending to wind up the web portion of the member between the flanges. A suitable solvent for bonding the polyurethane halves 62 and 63 is dimethyl formamide. Other solvents, such as tetrahydrofuram could also be employed. The solvent may be applied to the flanges of the halves 62 and 63 by means of a brush. Those areas not to be bonded, such that the surfaces about the lumen 15, may be masked with a solvent resistant substance such as silicon rubber moulding compounds preparatory to solvent application.

According to a further feature of the invention the solvent may be applied to the flanges 64 of the upper and lower halves 62 and 63 by a jet printer technique wherein the solvent is jet sprayed onto selected areas under pressure. The pressure from the jet spray disrupts the polymer chains and aids in proper bonding of the two halves.

As an additional feature of the invention a coloring agent, for example FDA approved food coloring in powder form, may be added to the solvent prior to its application to the flanges 64. The dissolved coloring agent in the solvent permits visual inspection for complete bonding in the case where a member defining a lumen is formed of a transparent or translucent material like the aforementioned polyurethane elastomer.

The solvent coated upper and lower halves 62 and 63 are permitted to remain in bonding contact for a period of time, for example one half hour, to permit evaporation and bonding to take place. It is estimated that 90% of the ultimate bond strength is obtained within one hour of bonding and 100% within 24 hours. After bonding the integrity of the lumen 15 defined by the bonded member 61 is tested by introducing air under pressure, 20-40 psi for example, in the lumen to insure that complete bonding of the halves 62 and 63 has occurred. Fluid connections to the lumen defining member 61 for testing or operation of the pump are made at suction and discharge openings 70 and 71 defined by the portions 72 and 73 of the cooperating, bonded halves 62 and 63. The portions 72 and 73 are accommodated by an appropriately shaped recess in the rectangular housing member 65 illustrated in FIG. 22. The portions 72 and 73 extend to the edge of the rectangular housing member 65 where fluid connecting lines or fittings are received in the openings 70 and 71.

It may thus be seen that the objects of the invention set forth, as well as those made apparent from the foregoing description, are efficiently attained. While preferred embodiments of the invention have been set forth for purposes of disclosure, modifications of the disclosed embodiments of the invention, as well as other embodiments thereof, may occur to those skilled in the art. Accordingly, the appended claims are intended to cover all embodiments which do not depart from the spirit and scope of the invention.

I claim:

1. A method of making a member defining a lumen for a peristaltic pump, which pump includes a housing member defining a cavity and having at least one opening in the walls thereof to receive the lumen defining member said lumen defining member having complementary upper and lower portions with flanges extending on both sides of said portions of said lumen defining member, comprising the steps of:

providing said housing member with separate means for locking material of the member defining a lumen thereto, substantially closing the cavity of said housing member with mould defining means configured to form one of said complementary concave upper and lower portions of said lumen defining member, including flanges extending on defining member.

introducing into said cavity in a plastic state the material to form said one of said portions of said lumen defining member and allowing said material to set such that said one of said portions of said lumen defining member is locked to said housing member by said locking means, and providing the other of said complementary portions of said lumen defining member and bonding said other portion to said one portion at the flanges extending on both sides of said lumen.

2. The method of claim 1, wherein the material of said member defining a lumen is an elastomeric low hysteresis polymer and the respective portions of said member are bonded to one another by solvent bonding.

3. The method of claim 2, wherein said bonding includes the preliminary step of jet spraying a solvent on the flanges of the respective portions of said members to disrupt polymer chains of said polymer.

4. The method of claim 2, wherein the solvent bonding of said portions includes applying a solvent to the flanges of said portions and placing the flanges of the respective portions in contact with one another, said solvent including a coloring agent to permit visual inspection for complete bonding in the case where the member defining a lumen is formed of a transparent or translucent material.

5. The method of claim 2, wherein the material of said member defining a lumen is a polyether based polyurethane elastomer.

6. The method of claim 5, wherein the flanges of the respective portions of said member defining a lumen are coated with dimethyl formamide and placed in contact with one another to effect said solvent bonding.

7. A member defining a lumen for a peristaltic pump made by the method of claim 1.

8. A method of making a member defining a lumen for a peristaltic pump, which pump includes a housing member defining a cavity and having at least one opening in the walls thereof to receive the lumen defining member said lumen defining member having complementary upper and lower portions with flanges extending on either side of said portions of said lumen defining member, comprising the steps of:

substantially closing the cavity of said housing member with mould defining means configured to form one of complementary concave upper and lower halves of said lumen defining member, including flanges extending on both sides of said one half of said lumen defining member, introducing into said cavity in a plastic state said material to form said one of said halves of said lumen defining member and allowing said material to set, and providing the other of said complementary upper and lower halves of said lumen defining member and chemically bonding said other half to said one half at the flanges extending on both sides of said lumen.

9. The method of claim 8, wherein the material of said member defining a lumen is an elastomeric low hysteresis polymer and the respective halves of said member are bonded to one another by solvent bonding.

10. The method of claim 9, wherein said bonding includes the preliminary step of jet spraying a solvent on the flanges of the respective halves of said members to disrupt polymer chains of said polymer.

11. The method of claim 9, wherein the solvent bonding of said halves includes applying a solvent to the flanges of said halves and placing the flanges of the respective halves in contact with one another, said solvent including a coloring agent to permit visual inspection for complete bonding in the case where the member defining a lumen is formed of a transparent material.

* * * * *